(12) United States Patent
Sutter

(10) Patent No.: US 10,751,921 B2
(45) Date of Patent: Aug. 25, 2020

(54) RECEIVING DEVICE AND INJECTION-MOLDING METHOD

(71) Applicant: STEFAN PFAFF WERKZEUG—UND FORMENBAU GMBH & CO KG, Röthenbach im Allgäu (DE)

(72) Inventor: Anton Sutter, Weiler-Simmerberg (DE)

(73) Assignee: Stefan Pfaff Werkzeug—Und Formenbau GmbH & Co. KG, Rothenbach im Allgau (DE)

( * ) Notice: Subject to any disclaimer, the term of this patent is extended or adjusted under 35 U.S.C. 154(b) by 275 days.

(21) Appl. No.: 15/800,550

(22) Filed: Nov. 1, 2017

(65) Prior Publication Data

US 2018/0065284 A1    Mar. 8, 2018

Related U.S. Application Data

(63) Continuation of application No. PCT/EP2016/060418, filed on May 10, 2016.

(30) Foreign Application Priority Data

May 13, 2015    (EP) .................................... 15167615

(51) Int. Cl.
*B29C 45/16*    (2006.01)
*B29C 45/14*    (2006.01)
(Continued)

(52) U.S. Cl.
CPC .. *B29C 45/14065* (2013.01); *B29C 45/14409* (2013.01); *B29C 45/1671* (2013.01);
(Continued)

(58) Field of Classification Search
CPC .. B29C 2045/14131; B29C 2045/2045; B29C 45/14409; B29C 2045/14459; B29C 45/14065
See application file for complete search history.

(56) References Cited

U.S. PATENT DOCUMENTS 4,321,225 A  *  3/1982  Jelinek .................. B29C 43/021
                                                    244/129.5
4,486,256 A     12/1984  Kranz
(Continued)

FOREIGN PATENT DOCUMENTS

DE    27 47 157 A1    4/1979
DE    32 16 063 A1    11/1983
(Continued)

OTHER PUBLICATIONS

Extended European Search Report (Application No. 15167615.2) dated Dec. 10, 2015.
(Continued)

*Primary Examiner* — Xiao S Zhao
*Assistant Examiner* — Emmanuel S Luk
(74) *Attorney, Agent, or Firm* — Burr & Brown, PLLC

(57) ABSTRACT

In order to reduce production tolerances, a receiving device is proposed for receiving a first, in particular a sealing profile for vehicle doors, which is designed to injection mold at least one, in particular two further profiles onto the first profile, comprising at least two molds, in order to hold the first profile in each of the molds at least in some sections, having a connecting device for connecting two of the at least two molds and for aligning the first profile, wherein the two interconnected molds each comprise at least one receiving opening for receiving and holding the profile and the connecting device, wherein the receiving opening is designed to be able to receive the first profile and the connecting device
(Continued)

in at least one of the two interconnected molds so as to be at least partly countersunk.

22 Claims, 3 Drawing Sheets

(51) Int. Cl.
| | |
|---|---|
| *B60J 10/80* | (2016.01) |
| *B29C 45/26* | (2006.01) |
| *B29L 31/26* | (2006.01) |
| *B29L 31/30* | (2006.01) |
| *B29C 45/00* | (2006.01) |
| *B29K 21/00* | (2006.01) |
| *B29K 23/00* | (2006.01) |

(52) U.S. Cl.
CPC .......... *B29C 45/1676* (2013.01); *B29C 45/26* (2013.01); *B60J 10/80* (2016.02); *B29C 45/14336* (2013.01); *B29C 2045/0093* (2013.01); *B29C 2045/14131* (2013.01); *B29C 2045/14459* (2013.01); *B29K 2021/003* (2013.01); *B29K 2023/12* (2013.01); *B29K 2023/16* (2013.01); *B29L 2031/26* (2013.01); *B29L 2031/3005* (2013.01)

(56) References Cited

U.S. PATENT DOCUMENTS

| | | | | |
|---|---|---|---|---|
| 4,580,962 A * | 4/1986 | Haas | ................... | B29C 33/0044 264/276 |
| 5,316,829 A * | 5/1994 | Cordes | .............. | B29C 45/14409 428/192 |
| 5,374,386 A * | 12/1994 | Nagata | .............. | B29C 45/14409 264/145 |
| 5,407,628 A * | 4/1995 | Nozaki | ............. | B29C 45/14409 264/259 |
| 5,478,519 A * | 12/1995 | Carrara | ............... | B29C 45/0055 264/267 |
| 5,562,961 A | 10/1996 | Buchholz et al. | | |
| 5,566,510 A * | 10/1996 | Hollingshead | .... | B29C 45/14409 49/475.1 |
| 5,829,378 A | 11/1998 | Nunes et al. | | |
| 5,972,268 A * | 10/1999 | Nakajima | ......... | B29C 45/14409 264/138 |
| 6,461,137 B1 * | 10/2002 | Ash | ..................... | B29C 33/0044 264/252 |
| 6,468,455 B1 * | 10/2002 | Kobayashi | .............. | B29C 37/02 264/161 |
| 8,561,831 B2 * | 10/2013 | Liao | ................. | B29C 45/14336 220/4.01 |
| 8,624,113 B2 * | 1/2014 | Ho | .................... | B29C 45/14336 174/50 |
| 2006/0222841 A1 * | 10/2006 | Masumizu | ........ | B29C 45/14336 428/319.3 |
| 2007/0108657 A1 * | 5/2007 | Ferguson | .......... | B29C 45/14065 264/272.11 |
| 2007/0210616 A1 * | 9/2007 | Wenzel | ................. | B29C 45/006 296/187.03 |
| 2007/0252292 A1 * | 11/2007 | Choi | ................. | B29C 45/14065 264/1.1 |
| 2008/0001324 A1 * | 1/2008 | Kubo | .................. | B29C 33/3828 264/177.1 |
| 2009/0202884 A1 * | 8/2009 | Morimoto | ........... | H01M 8/2483 429/494 |
| 2011/0101564 A1 * | 5/2011 | Keenihan | .......... | B29C 45/14336 264/277 |
| 2011/0127692 A1 * | 6/2011 | Watanabe | .......... | B29C 45/14336 264/251 |
| 2011/0272859 A1 * | 11/2011 | Sitterlet | ............ | B29C 45/14377 264/325 |
| 2014/0212621 A1 * | 7/2014 | Blottiau | .............. | B29C 45/1676 428/99 |
| 2016/0167268 A1 * | 6/2016 | Muhlemann | ...... | B29C 45/14336 264/255 |
| 2017/0129141 A1 * | 5/2017 | Masaka | .................... | B29C 33/14 |
| 2017/0326698 A1 * | 11/2017 | Reiners | .................. | B23Q 3/064 |
| 2018/0178424 A1 * | 6/2018 | Faik | ..................... | B29C 45/1418 |
| 2018/0257282 A1 * | 9/2018 | Neerincx | ................ | B29C 45/14 |
| 2019/0061214 A1 * | 2/2019 | Groters | .................... | B60J 10/00 |

FOREIGN PATENT DOCUMENTS

| | | |
|---|---|---|
| DE | 32 32 700 A1 | 3/1984 |
| DE | 43 14 191 C1 | 8/1994 |
| DE | 10 2013 011 762 A1 | 4/2014 |
| EP | 0 372 745 A1 | 6/1990 |
| EP | 2 546 846 A1 | 1/2013 |
| FR | 2 233 485 A1 | 1/1975 |
| FR | 2 668 095 A1 | 4/1992 |
| JP | 2002-067077 A1 | 3/2002 |
| WO | 2012/153234 A1 | 11/2012 |

OTHER PUBLICATIONS

International Search Report and Written Opinion (Application No. PCT/EP2016/060418) dated Jul. 14, 2016.
English translation of International Preliminary Report on Patentability (ChapterI) (Application No. PCT/EP2016/060418) dated Nov. 23, 2017.

* cited by examiner

RECEIVING DEVICE AND INJECTION-MOLDING METHOD

CROSS REFERENCE TO RELATED APPLICATIONS

This application is a continuation of International Application No. PCT/EP2016/060418 filed May 10, 2016, which designated the United States, and claims the benefit under 35 USC § 119(a)-(d) of European Application No. 15167615.2 filed May 13, 2015, the entireties of which are incorporated herein by reference.

FIELD OF THE INVENTION

The present invention relates to a receiving device for receiving a first profile, in particular, a sealing profile for vehicle doors, and an injection-molding method for corresponding profiles.

BACKGROUND OF THE INVENTION

It is known from the prior art how to fabricate sealing profiles, for example, for vehicle doors, by injection molding individual profile pieces onto a first profile, a so-called central profile. In order to carry out such an injection-molding process, either the central profile is pushed into a mold or the mold is pushed onto the profile, while the profile being injected molded is likewise received in a region of the mold. In order to undertake a further injection-molding process, the profile is removed from the mold and then another mold is pushed on in order to connect another profile to the central profile. Separate injection-molding processes in which no profile is attached, but merely the end of a profile is provided with a plastic closure, can also be performed.

SUMMARY OF THE INVENTION

The problem which the present invention proposes to solve is to provide a receiving device and an injection-molding method in which the manufacturing tolerances can be reduced.

The receiving device according to the present invention serves at first to receive a first, central profile, in particular a sealing profile for vehicle doors, in order to injection mold at least one, in particular two further profiles onto the first profile. For this purpose, the receiving device is installed or arranged in a corresponding injection-molding machine. To this end, the receiving device according to the present invention comprises at least two molds in order to hold the first profile in each of the molds at least in some sections.

In the present case, a mold is understood to mean a holding device for a profile, which encloses the profile in particular on five sides and/or completely and in which the injection-molding process is performed. The mold can be installed as a whole in an injection-molding machine. It may also be assembled from individual mold parts.

In the receiving device according to the present invention the at least two molds are interconnected by a connecting device, wherein a connecting device in each case interconnects two of the at least two molds. Basically, as many connecting devices as desired may be provided. The connecting device serves additionally for alignment of the first profile, that is, the first profile may lie against the connecting device and thus be positioned (for example, straightened out). In advantageous manner, the first profile may in this way be held in a stable shape for its entire length or at least approximately its entire length. The molds, in turn, have a receiving opening to receive and hold the profile. For the introduction of the profile, generally either the mold is pushed onto the profile, or vice versa, the profile is pushed into the mold.

In the present case, according to the present invention, the connecting device is also introduced into the receiving opening. The receiving opening is accordingly designed to receive the first profile and the connecting device in at least one of the two interconnected molds so as to be able to be at least partly countersunk.

Thus, the receiving device according to the present invention makes it possible for the holding which is necessary for the processing of the profile to occur over approximately the entire length and at the same time several molds are used for the injection molding of the first profile. Thus, two molds are generally juxtaposed so that the central profile can be partly received in each of the two molds and held between them. For example, a further profile can be injection molded in each mold. Also, a third mold (or more molds) can be used in addition, if necessary. Due to the fact that the first, central profile is thus held in a stable shape at least over almost its entire length and at least two injection molds are also involved in this holding process, it is possible to perform several (at least two) injection-molding processes in parallel. Thus, thanks to this measure, a more precise fabrication with lower tolerances can also be achieved, because after one injection-molding process the profile does not have to be removed to perform the next injection-molding process. This holds especially for injection-molding processes in which not only a final processing is done, but also those in which two profiles are interconnected by an injection-molding process. In a simple final processing, generally only plastic is placed on the profile, but no additional profile is joined to the central profile.

It is conceivable according to the present invention to secure the receiving device in a single injection-molding machine and to perform the processing/injection-molding processes there. Depending on the type of profile being processed, however, it may be advantageous to secure the receiving device in different injection-molding machines for different injection-molding processes. The injection-molding machines may in this case be arranged in a fixed position relative to each other. Depending on the profile being processed, there might otherwise be space problems if the corresponding injection-molding units are positioned with respect to the profile. Furthermore, it may also be advantageous to use different injection-molding units when different plastics are being injected. Basically, however, it is also conceivable to incorporate the receiving device according to the present invention in a single injection-molding machine and to perform the injection-molding process there. The present invention advantageously makes it possible to undertake a simultaneous injection molding of different components, in particular also of components which are different in their processing parameters and their processing time. In the present case, a component is understood to mean the plastic to be injection-molded, for example, a thermoplastic elastomer or EPDM. Moreover, the present invention makes it possible to mold two different components onto the profile at the same time in a mold (generally at different places on the profile).

Every time that a mold is pushed onto a profile or every time that a profile is held in general, tolerances are basically involved, whether due to systematic or statistical errors. Therefore, the tolerances can basically be decreased if the number of clamping processes to be performed during the processing, whereby the profile is introduced into molds, is chosen to be as small as possible, and several processing steps can be carried out with one of the molds therefor.

It is also possible in one variant embodiment of the present invention to provide, for example, one end of a profile with a molded-on closure (end molding), without attaching a further profile to it. Moreover, so-called positioning pins can be molded on, which can serve as reference marks for the positioning. This variant can, therefore, be used in an especially flexible manner.

Oftentimes positioning pins, but also sometimes end moldings or even moldings for the connection of two profiles are molded on with another component (a different plastic). The fabrication then provides injection-molding processes with at least two components. One advantageous modification of the present invention accordingly allows the connection for connecting an additional injection-molding unit in order to injection mold an end molding and/or a positioning pin and/or another profile with a different component. Thus, these two processes with different components can be undertaken at the same time, without having to remove the profile and introduce it into a new mold. The fabrication can not only be simplified in this way, but also it can become more precise, and time can be saved.

In one embodiment of the present invention, the receiving device may be designed to adjust the distance between the two connected molds. This is especially advantageous if the receiving device is incorporated in the injection-molding machine or the injection-molding machines, because in this way it is possible to somewhat equalize tolerances in the positioning of the receiving device in the injection-molding machine or machines. For example, if two injection-molding machines are prepositioned at a fixed distance and in a fixed position, so that the receiving device can be introduced into the two injection-molding machines, where one of the molds used is incorporated in one injection-molding machine and the other mold in the other injection-molding machine, any distance tolerances between the molds can be equalized by adjusting the distance of the molds relative to each other. In particular, it is conceivable for the injection-molding machines to be prepositioned in advance more precisely than the length of the central profile has been measured off.

For this, the connecting device may be mounted, for example, with play in the receiving opening. Preferably, the connecting device has a stop up to which a displacement of the connecting device within the receiving opening can occur.

Furthermore, in one sample embodiment of the present invention, it is also possible for the receiving device to be movable with the profile held in a stable position in the at least two molds and with the molds mounted in a stable position. Thanks to this measure, it is possible to also perform a further processing with the same receiving device and with correspondingly slight tolerances.

In order to have a reference point in the further processing and/or fitting of the profiles, so-called positioning pins may be attached to the profiles. These positioning pins generally involve an injection-molded plastic material. During fabrication, the first profile is generally introduced into the mold, or the mold is pushed onto the first profile and the positioning pin may then be injection molded onto the first profile. Basically, however, in one modification of the present invention, it is conceivable for a mold to have a stop for an already present positioning pin, which has been previously injection molded on the first profile, in order to be able to receive the first profile in a defined manner with respect to its position in the molds. Once again, manufacturing tolerances can be improved in this way.

Moreover, in one sample embodiment of the present invention, a guide may also be provided, such as a linear guide, for receiving the positioning pin. In this way, a simple, rapid and precise positioning of the profile can be performed. The handling can be greatly simplified, especially in a robot-controlled positioning.

Since the profile usually does not remain permanently in the mold during the fabrication, in one variant embodiment of the present invention one of the molds may have at least one ejection device, which is designed to remove the profile from the mold once more. Such an ejector may have a movable cylinder or ram which forces the profile out from the mold. In one especially preferred modification of the present invention, the ejection devices are designed to be extended synchronously in order to eject the profile or profiles. Especially when using at least two molds, the profile sections held in the molds can thus be ejected simultaneously. It is conceivable to provide one or more ejection devices for each mold. This measure can not only shorten the processing time, but also the actual processing of the profile can be simplified, because the holding state can also be released at several places at the same time.

Usually a sample embodiment of the present invention can be designed so that the receiving device itself or the corresponding molds are designed and/or arranged to hold the first profile at least at its ends. The processing often takes place in these regions. Furthermore, the most stable posture of the profile during the fabrication is generally to be expected when at least its ends or the region of the ends are/is being held.

If the profiles are sealing profiles for vehicles, these are usually flexible and therefore require corresponding holders for their further processing. Once the corresponding injection-molding process has taken place, further processing is optionally carried out, such as trimming the profiles. If this processing requires a removal of the profile from the receiving device or from the molds, in one advantageous embodiment of the present invention at least one of the molds has at least one section for holding, especially for shape-stable holding of the first profile, which section can be ejected together with the first profile. It is also conceivable that the handling of the profile occurs directly on this ejectable section itself, that is, this ejectable section may for example be grasped by a robot arm, or also possibly manually, so that the profile can be further transported and positioned. This also further improves the manufacturing tolerance, since the ejectable section holds the profile in a defined manner and thus a reference mark is provided for the further positioning with respect to the profile.

Accordingly, a method for injection molding, especially for profiles such as sealing profiles for vehicle doors, is distinguished in that a receiving device according to the present invention or one of the sample embodiments is used. This method enables, in particular, the injection molding of at least two profiles onto a first, central profile. Thus, the already mentioned technical benefits of the receiving device according to the present invention or the benefits of its embodiments can be utilized. Moreover, it becomes possible to carry out two injection-molding processes at the same time in the method according to the present invention. This applies not only to the parallel injection molding of several profiles onto a first profile, but also the simultaneous injection molding of different components onto a profile, and this even when the components have different processing parameters, especially different processing times.

Basically, during the injection-molding process according to the present invention, the profile is held in a shape-stable manner by the molds and by the connecting device. To enhance this action and to enable a further shape-stable processing of the profile, the first profile may be provided with a core as a carrier, wherein the core, in particular, is provided of metal or plastic or also possibly a composite material. Generally this is a comparatively hard material, so as to achieve the shape stability. Thanks to this measure, the fabrication is generally greatly simplified.

The profile in one variant embodiment of the present invention may be aligned or even held for its entire or at least almost its entire length. On the one hand, this holds the profile in a defined manner in a processing position. In particular, the connecting device serves for the shape-stable holding over the entire or at least a major portion of the length of the central profile. Thanks to the most position-exact holding possible, tolerances can be improved and the processing of the profile simplified.

In an especially preferred modification of the present invention, the at least two profiles are injection molded onto the first profile at the same time. The positioning of the injection molded profiles with respect to the first profile may thus occur in an especially precise manner. On the whole, however, the processing time for the profile is also significantly shorter than in traditional methods, because the injection molding can occur at the same time and furthermore the first profile does not need to be removed from its mold and introduced into another mold.

In an especially advantageous manner, one embodiment of the present invention enables a simultaneous injection molding to be performed at different places on the first profile of at least two different materials with different processing time, in particular of thermoplastic elastomers (TPE) and for example EPDM (ethylene-propylene-diene rubber). Such materials differ very much from each other, especially in their processing time, so that it now becomes possible for the first time to injection mold them in parallel. The processing time, but also the manufacturing precision, can be significantly improved in this way.

BRIEF DESCRIPTION OF THE DRAWINGS

Sample embodiments of the present invention are represented in the drawings and shall be explained more closely below with mention of further features and advantages.

DETAILED DESCRIPTION OF THE INVENTION

Figure 1:
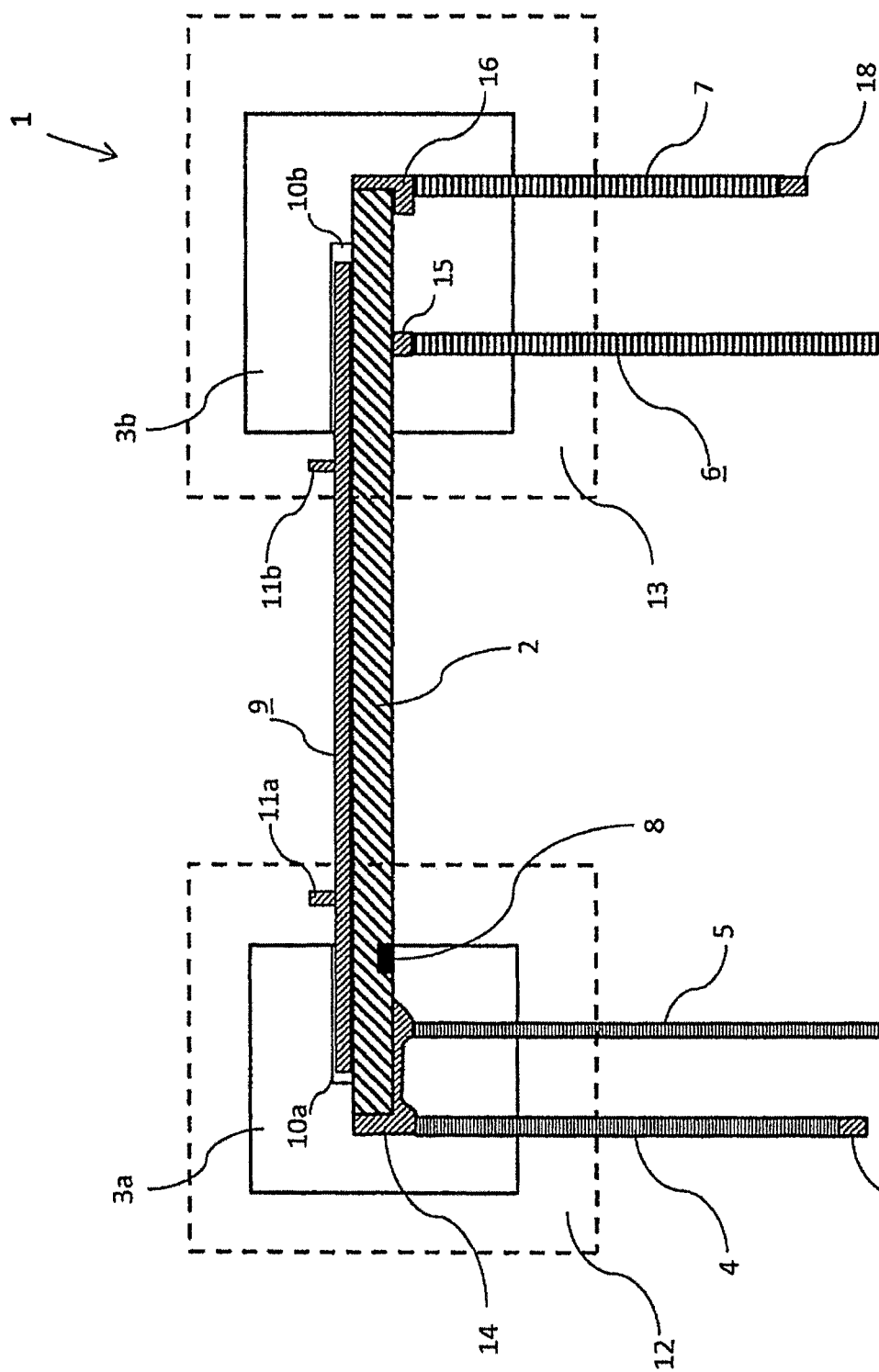
FIG. 1 shows an arrangement of a receiving device according to the present invention in an injection-molding machine.

FIG. 1 shows a receiving device 1, in which a first, central profile 2 has been introduced. The receiving device 1 comprises two molds 3a and 3b, the first profile being mounted at its left end in the mold 3a and at its second end in the mold 3b. The profiles 4, 5, 6 and 7 should be injection molded onto the first profile 2, for which the profiles 4, 5 can be mounted in the mold 3a and can be injection molded at the end there, while the profiles 6, 7 can be connected via the mold 3b to the first profile 2. During the injection-molding process in the mold 3a, a positioning pin 8 is additionally injection molded. The positioning pin 8 is injection molded with a different component than the profiles 4, 5, 6 and 7.

Between the molds 3a and 3b there is arranged a connecting device 9. Each of the molds 3a, 3b has a receiving opening 10a, 10b, in which both the corresponding end of the first profile 2 and the corresponding part of the connecting device 9 is introduced. The first profile 2 is mounted in a shape-stable manner between the two molds, by lying against the connecting device 9. The connecting device 9, in turn, can be displaced slightly between the stops 11a and 11b, so that accordingly a slight adapting of the distance between the two molds 3a and 3b according to the length of the first profile 2 and according to the spacing of the two injection-molding machines 12, 13 can be adapted and selected.

The two injection-molding machines 12, 13 are firmly positioned relative to one another and have a defined spacing. Firmly defined spacing parameters are now also dictated in the region of the first profile 2, by the apportioning of which a more accurate overall tolerance can be achieved. For example, if one starts from the left stop in the region of the mold 3a, a positioning can be performed relative to the positioning pin 8, for example. The profiles 6 and 7 can basically be positioned with respect to two reference points, namely, the left stop within the mold 3a on the one hand and with respect to the positioning pin 8 on the other hand. The profiles 4, 5, 6, 7 are each injection molded at the locations 14, 15 and 16 in the connection region to the first profile. These locations 14, 15, 16 are injection molded with one or more thermoplastic elastomers.

In the present case, it is also possible to injection mold two different components in one of the molds 3a or 3b or also one beneath the other in the respective molds. This injection molding may occur at the same time, and this is also advantageously possible when the processing time is of different length. The positioning pin 8 is injection molded with a different plastic, such as PP (polypropylene).

Furthermore, plastics can basically also be injection molded in the end region of profiles, whether in the end region of the first, central profile or in the end region of another secondary profile. Such regions, which in the present case could also have been injection molded prior to this, are situated for example at the end regions of the profile 4 (location 17) and in the end region of the profile 7 (location 18). In the present case, the overall profile, consisting of the individual profiles 2, 4, 5, 6, 7, is a sealing profile for a vehicle door, wherein the portion in the region of the mold 3a is used for the B-column and the region in connection with the mold 3b for the C-column.

Figure 2:
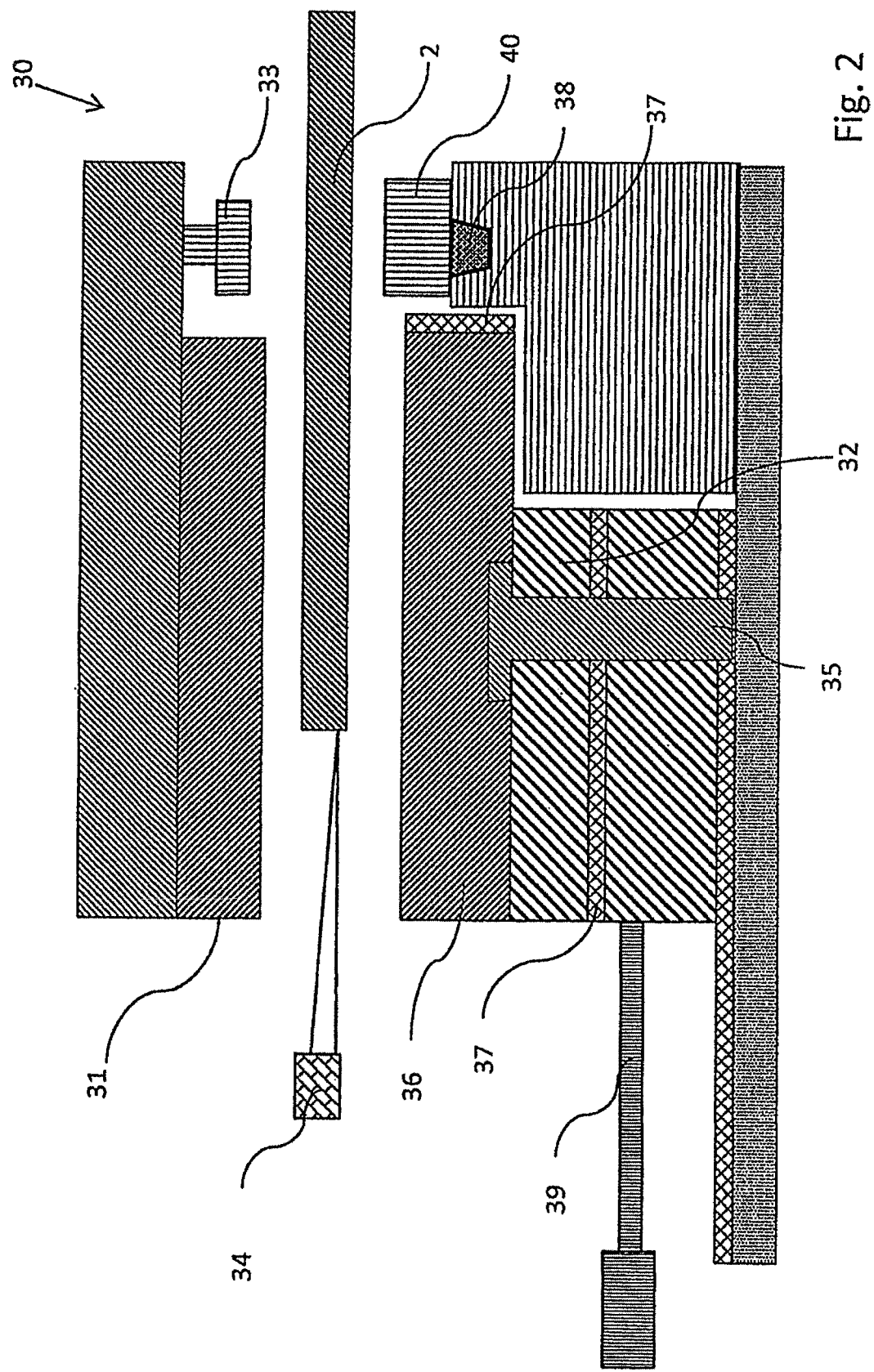
FIG. 2 shows a schematic representation of a mold of a receiving device according to the present invention.

FIG. 2 shows a mold 30 with a top piece 31 and a bottom piece 32, wherein the top piece 31 has a pressing piece 33 for pressing on the profile 2. The position of the profile 2 is determined and positioned by a laser-operated optical distance sensor 34. Integrated in the bottom piece 32 is an ejector 35. The profile 2 is injection molded with EPDM in the region of the mold part 36. In the region of the mold part 38, in turn, the positioning pin is injection molded. For insulation, insulating regions 37 are provided. The injection molding with EPDM in the mold part 36 occurs at significantly higher temperatures than for PP in the region 38. An end region 56 may for example also be used as a stop for the positioning. Basically, in an advantageous manner, cutting tolerances generally have no effect on the length dimensions. Whereas at one side an end (such as the end 56) can serve as a stop for the positioning, and in the present case an injection molding will occur there anyway per FIG. 2, on the opposite side a length control can be done with the aid of an optical distance sensor 34. Because the positioning pin 8 can be used as a profile receiver, an even more precise positioning of the profile in production is possible. The mechanical drive for the ejector 35 may take place via a cylinder 39 or mechanically. The valves 40 are braced against the injection pressure.

Figure 3:
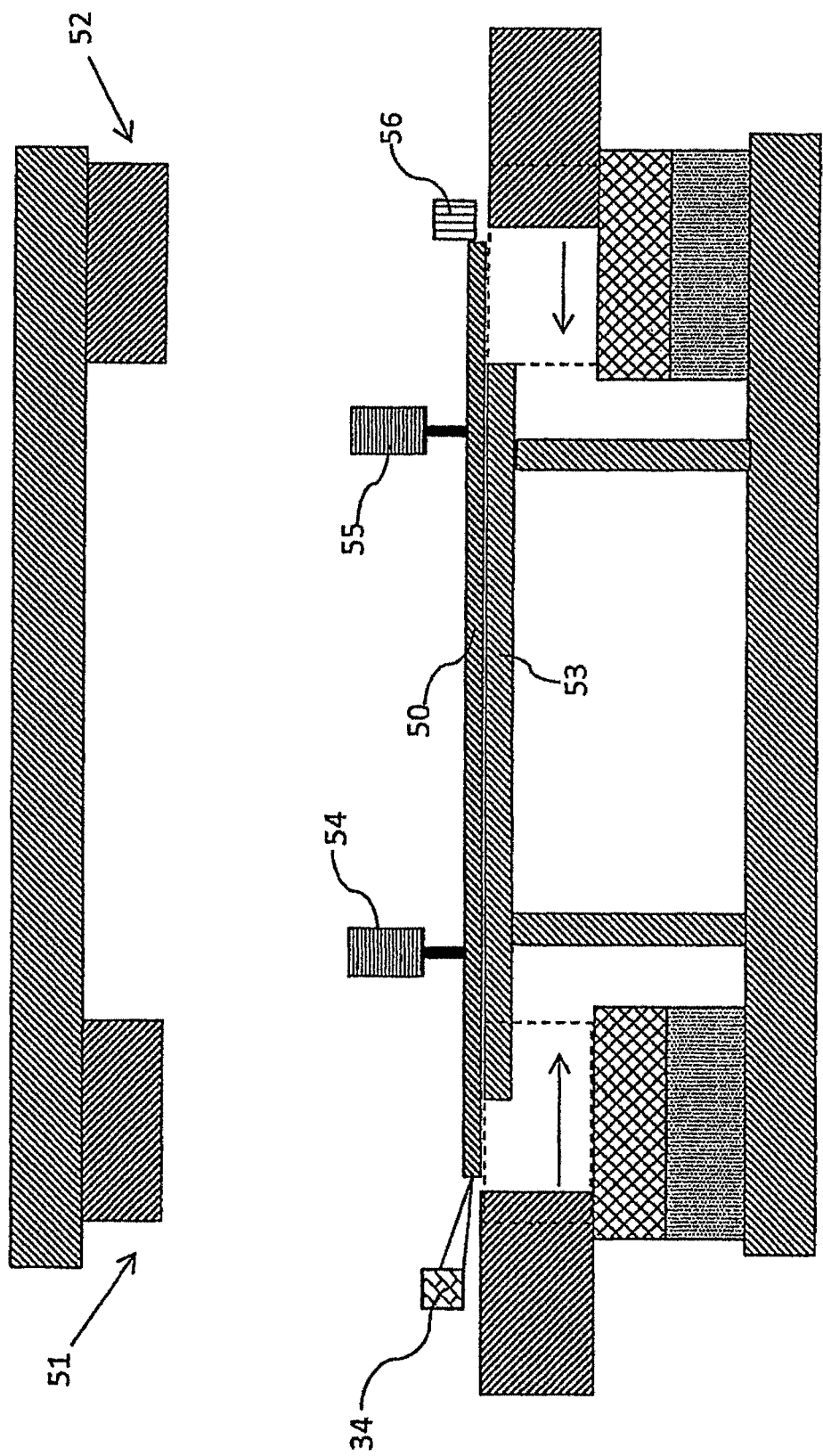
FIG. 3 shows another arrangement of a receiving device according to the present invention in an injection-molding machine.

FIG. 3 shows a roof profile 50 which is mounted between two molds 51, 52 and held in a shape-stable manner by a connecting device 53. A profile clamping occurs in the regions 54, 55. In the right region of the profile 50 (per FIG. 3), an injection molding 56 has been performed at its end. This end 56 of the profile 50 serves as a stop in the mold 52 for the further positioning. At the other end of the profile 50, a length/position control is effected by the optical sensor 34. The molds 51, 52 are each pushed onto the roof profile 50 on both sides. The accuracy of the positioning is thus generally especially good. The positioning can be done entirely automatically. Advantageously, TPE, which requires a different process sequence, and EPDM can be injection molded in parallel (simultaneous injection molding).

LIST OF REFERENCE NUMBERS

1 Receiving device
2 First/central profile
3a Mold
3b Mold
4 Secondary profile
5 Secondary profile
6 Secondary profile
7 Secondary profile
8 Positioning pin
9 Connecting device
10a Receiving opening
10b Receiving opening
11a Stop
11b Stop
12 Injection-molding machine
13 Injection-molding machine
14 Moldings for the profile connection
15 Moldings for the profile connection
16 Moldings for the profile connection
17 End moldings
18 End moldings
30 Mold
31 Top piece
32 Bottom piece
33 Pressing piece
34 Optical distance sensor
35 Ejector
36 EPDM molding/mold part
37 Insulation
38 Mold part (positioning pin)
39 Cylinder mechanism
40 Valves
50 Roof profile
51 Mold
52 Mold
53 Connecting device
54 Profile clamping
55 Profile clamping
56 End stop

The invention claimed is:

1. A receiving device for receiving a first profile, the receiving device configured to injection mold at least one further profile onto the first profile, comprising at least two molds in order to hold at least some sections of the first profile in each of the molds, having a connecting device for connecting two of the at least two molds and for aligning the first profile, wherein each mold comprises a receiving opening for receiving the first profile and the connecting device, and wherein the receiving opening is configured, in at least one of the at least two molds, to adjust a distance between the at least two molds along the connecting device mounted therebetween and receive the first profile and the connecting device, such that the first profile and the connecting device are at least partly countersunk, respectively.

2. The receiving device as claimed in claim 1, wherein at least one of the at least two molds is configured to carry out an injection molding onto the first profile to produce an end molding and/or to produce a positioning pin.

3. The receiving device as claimed in claim 1, wherein a connection is present for connecting an additional injection-molding unit in order to mold on an end molding and/or a positioning pin and/or another profile with a component other than the component used for the injection molding of the at least one further profile.

4. The receiving device as claimed in claim 3, further comprising a guide for receiving the positioning pin and for guiding the first profile via the positioning pin, wherein a stop for the positioning pin is present, up to which the first profile can be displaced and received in at least one of the at least two molds.

5. The receiving device as claimed in claim 4, wherein the guide is a linear guide.

6. The receiving device as claimed in claim 1, wherein the receiving device is movable with the first profile held in a stable position in the at least two molds and with each of the molds mounted in a stable position.

7. The receiving device as claimed in claim 1, wherein a stop for a positioning pin is provided on the first profile, in order for at least one of the at least two molds to be able to receive the first profile with respect to its position in the at least one of the at least two molds.

8. The receiving device as claimed in claim 1, wherein at least one of the at least two molds has at least one ejection device.

9. The receiving device as claimed in claim 8, wherein the at least one of the at least two molds has at least two ejection devices designed to be extended synchronously in order to eject at least one of the first profile and the at least one further profile.

10. The receiving device as claimed in claim 1, wherein the at least two molds are configured to hold at least ends of the first profile.

11. The receiving device as claimed in claim 1, wherein at least one of the at least two molds has at least one section for shape-stable holding during further processing of the first profile, which section can be ejected together with the first profile.

12. A method for injection molding at least two profiles onto a sealing profile for vehicle doors, wherein the receiving device as claimed in claim 1 is used.

13. The method as claimed in claim 12, wherein the first profile comprises a core as a carrier.

14. The method as claimed in claim 13, wherein the core is made of metal and/or plastic and/or composite material.

15. The method as claimed in claim 12, wherein the first profile is clamped along its entire length.

16. The method as claimed in claim 12, wherein the at least two profiles are injection molded onto the first profile at the same time.

17. The method as claimed in claim 12, wherein a simultaneous injection molding is performed at different places on the first profile of at least two different materials having different processing times.

18. The method as claimed in claim 17, wherein the two different materials are selected from thermoplastics and elastomers.

19. The method as claimed in claim 17, wherein the two different materials are TPE and EPDM.

20. The receiving device as claimed in claim 1, wherein the first profile is a sealing profile for vehicle doors.

21. A receiving device for receiving a first profile, the receiving device configured to injection mold at least one further profile onto the first profile, comprising at least two molds in order to hold at least some sections of the first profile in each of the molds, having a connecting device for connecting two of the at least two molds and for aligning the first profile, wherein each mold comprises a receiving opening for receiving the first profile and the connecting device, wherein the receiving opening is configured to receive the first profile and the connecting device such that the first profile and the connecting device are at least partly countersunk, respectively, and wherein the receiving device is configured to adjust the distance between the at least two molds by being able to mount the connecting device with play in the receiving opening of at least one of the at least two molds.

22. The receiving device as claimed in claim 21, wherein the connecting device has a stop up to which a displacement of the connecting device within the receiving opening of the at least one of the at least two molds can occur.

\* \* \* \* \*